(12) United States Patent
Hall

(10) Patent No.: US 7,967,544 B2
(45) Date of Patent: Jun. 28, 2011

(54) LOAD CARRYING VEHICLES

(76) Inventor: Anthony Hall, Murwillumbah (AU)

( * ) Notice: Subject to any disclaimer, the term of this patent is extended or adjusted under 35 U.S.C. 154(b) by 767 days.

(21) Appl. No.: 11/917,225

(22) PCT Filed: Jun. 14, 2006

(86) PCT No.: PCT/AU2006/000817
§ 371 (c)(1),
(2), (4) Date: Dec. 12, 2007

(87) PCT Pub. No.: WO2006/133489
PCT Pub. Date: Dec. 21, 2006

(65) Prior Publication Data
US 2008/0206032 A1    Aug. 28, 2008

(30) Foreign Application Priority Data

Jun. 14, 2005    (AU) .............................. 2005903058

(51) Int. Cl.
*B60P 1/48* (2006.01)

(52) U.S. Cl. ......... 414/498; 414/471; 414/491; 414/546
(58) Field of Classification Search ................... 414/498
See application file for complete search history.

(56) References Cited

U.S. PATENT DOCUMENTS

| | | | |
|---|---|---|---|
| 3,454,175 A | | 7/1969 | Kellaway |
| 4,175,904 A | | 11/1979 | Airaksinen |
| 4,350,469 A | * | 9/1982 | Corompt ........................ 414/420 |
| 4,755,098 A | * | 7/1988 | Wulf et al. ..................... 414/546 |
| 5,108,247 A | * | 4/1992 | Vlaanderen ................... 414/421 |
| 5,601,393 A | * | 2/1997 | Waldschmitt ................. 414/498 |
| 5,678,978 A | | 10/1997 | Markham |
| 7,278,816 B2 | * | 10/2007 | Marmur et al. ............... 414/491 |
| 2008/0317570 A1 | * | 12/2008 | Bain et al. ..................... 414/498 |

FOREIGN PATENT DOCUMENTS

| | | |
|---|---|---|
| CA | 990762 | 6/1976 |
| EP | 408744 | 6/1997 |
| GB | 2259688 | 3/1993 |
| JP | 2002-46523 | 2/2002 |
| WO | 01/17818 | 3/2001 |

* cited by examiner

*Primary Examiner* — Saúl J Rodríguez
*Assistant Examiner* — Joshua I Rudawitz
(74) *Attorney, Agent, or Firm* — Shoemaker and Mattare

(57) ABSTRACT

A load carrying vehicle (10) having a mobile chassis (11) and a load carrying body or tray (15) mounted to the chassis (11) so as to be capable of pivotal movement about a pivot axis defined by a releasable pivot connection (16) between the chassis (11) and body (15) for tipping of the body about a pivot axis. Alternatively the load carrying body (15) may be mounted to the chassis (11) through rollers (19) which permit movement of the body longitudinally of the chassis (11) and tilting movement about a tilt axis.

20 Claims, 5 Drawing Sheets

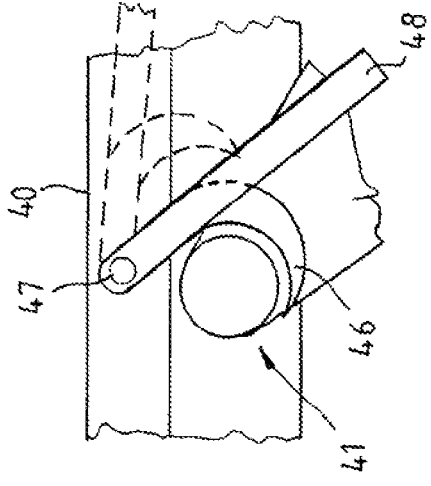
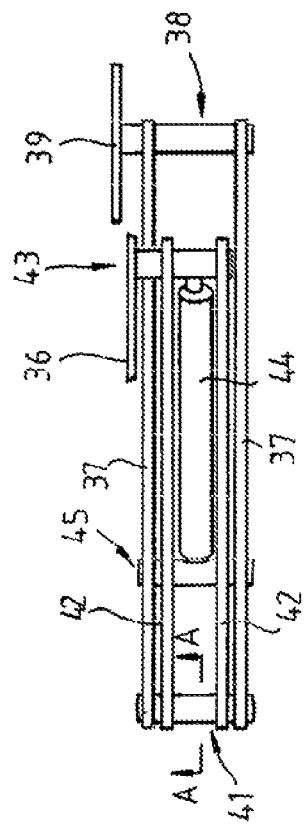
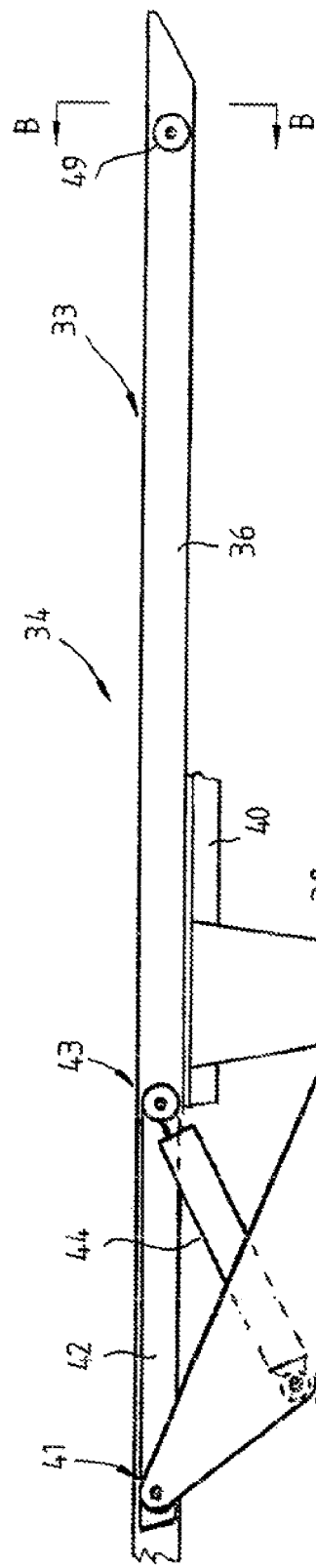
FIG. 6
FIG. 5
FIG. 4

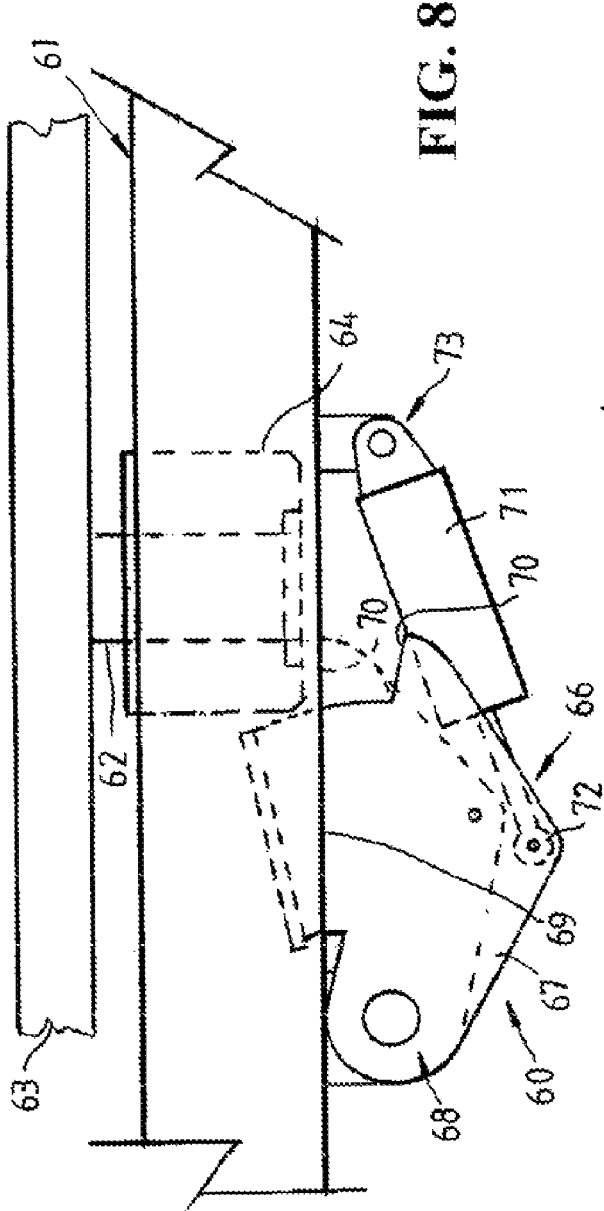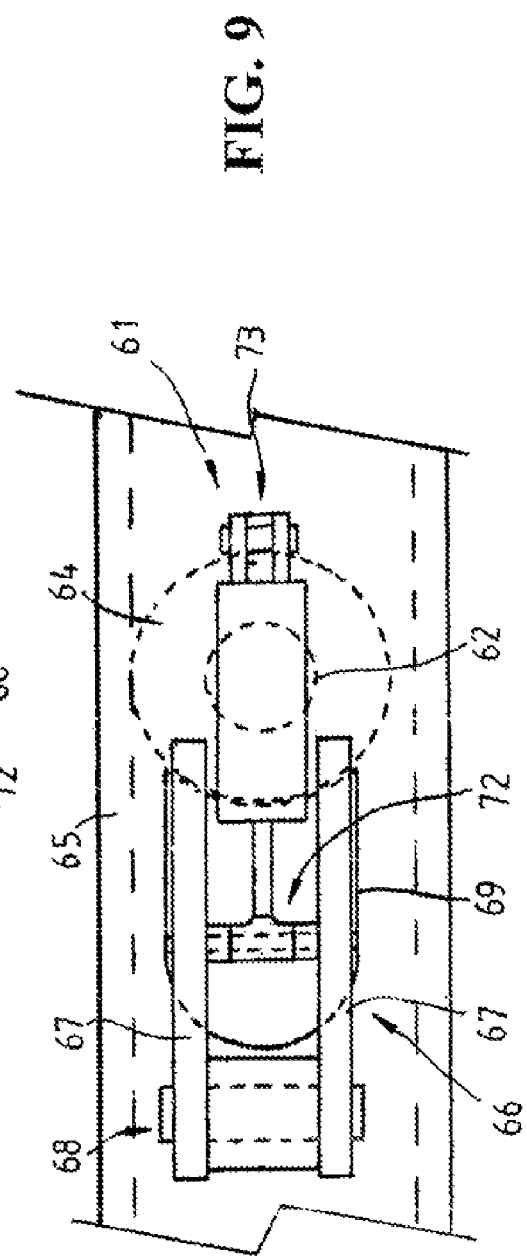

LOAD CARRYING VEHICLES

TECHNICAL FIELD

This invention relates to improvements to load carrying vehicles and in particular to vehicles having a load carrying body such as a platform, tray or a container-like dump body which is movable to enable unloading of the load carrying body.

BACKGROUND ART

Many different types of load carrying vehicle are available in use for carrying different types of loads. One type of common vehicle comprises a tip truck having a tiitable dump body which, defines a container which may be used for containing earth of earthmoving purposes. Earthmoving contractors often use this type of vehicle for the dual purpose of transporting earthmoving machinery to undertake certain earthmoving operations and then use the vehicle for holding and transporting soil, rocks or other materials to a location at which the body may be tipped to deposit the soil, rocks or other materials onto the ground or as required. In order to utilize such vehicles to cany earthmoving machinery such as track-type earthmoving machinery to a site where earthmoving is to be undertaken, it is necessary to utilize ramps which are placed, between the vehicle body and the ground. This then enables the earthmoving machinery to be driven from the body down onto the ground via the ramps and enables the earthmoving machinery to be driven up onto the body via the ramps. To unload the earthmoving machinery, it is necessary for the machinery to be backed off the body onto the ramps however this is difficult as the operator of the machinery does not have a clear view of the ramps and thus it is difficult to align the machinery with the ramps. There is thus a risk that machinery being unloaded from the vehicle body can fall from the ramps and thus there is a high safety risk both to the operator and persons in the vicinity of the vehicle. This procedure is also unsafe where the ground is uneven or not level as the ramps extending between the vehicle and ground will not be aligned so that machinery supported on the ramps will, be unstable. In addition, the ramps, which are used are usually heavy and difficult to manipulate and carry as well as store when not in use. There is also a risk that ramps can be stolen.

The alternative to using a dump truck for the dual purposes of transporting earth moving machinery and also for carrying soil other materials is to use a vehicle with a tiitable tray on which the eartbmovmg machinery may be carried and transported to site. After unloading of the earthmoving machinery at a site however, the vehicle is no longer used and it is necessary to have available a second vehicle having a body which can carry soil or other materials. This obviously is not efficient and increases costs.

Similar issues arise in other applications for example in farming applications where inefficiencies arise in transporting farm machinery and also in carrying farm produce.

SUMMARY OF THE INVENTION

The present invention aims to provide an improved load carrying vehicle and in particular to a load carrying vehicle having a movable load carrying body which may operated in a tipping mode or in a tilting mode. Other objects and advantages of the invention will become apparent from the following description.

The present invention thus provides a load carrying vehicle having a mobile chassis and a load carrying body mounted to said chassis so as to be capable of pivotal movement about a pivot axis extending transversely of said chassis and substantially fixed relative to said chassis for tipping of said body about said axis, said load carrying body being further capable of movement longitudinally of said chassis and tilting movement about a tilt axis whereby the trailing end of said body may be moved rearwardly of said chassis and to an inclined attitude.

Preferably releasable pivot means are provided between the body and chassis to enable the body to pivotally move about the pivot axis. The pivot axis is suitably at or adjacent the rear of the chassis.

Preferably the pivot means comprises a pivot shaft or pin which may provide the pivot connection between the load carrying body and vehicle chassis. The load carrying body suitably carries a pivot member and the pivot shaft or pin is adapted to be moved into engagement with the pivot member to define the pivot connection. The pivot means suitably comprise pivot shafts or pins on mounted on opposite sides of the chassis and engageable with respective pivot members carried by the load carrying body. Preferably actuating means are provided to advance the pivot shaft or pin into engagement with the pivot member or retract the pivot shaft or pin to disengage the pivot shaft or pin from a pivot member. The actuating means may be connected to the respective pivot shafts or pins on opposite sides of the chassis to enable the pivot shafts or pins to be advanced or retracted simultaneously. The actuating means may comprise manually operated actuating means such as a suitable linkage assembly and actuating lever or may comprise a solenoid actuator or fluid actuator such as an hydraulic ram.

Preferably rollers are provided on the chassis to provide rolling support for the load carrying body to allow the longitudinal and tilting movement of the body. The rollers are suitably mounted on opposite sides of the vehicle chassis for cooperation with respective chassis members of the load carrying body. Preferably the chassis members of the load carrying body comprise channel shaped members and the rollers are located in respective channels of the channel shaped members.

Preferably the rollers are supported on shafts or axles mounted to the vehicle chassis. The shafts or axles are suitably mounted to respective chassis members of the vehicle chassis. The shafts or axles may be fixed to the vehicle chassis or may be mounted for movement relative to the chassis. Where the shafts or axles are mounted for movement relative to the chassis members, they also suitably comprise the pivot shafts or pins which connect the load carrying body to the chassis for tilting movement about a transverse pivot axis. Preferably in this configuration the pivot members carried by the load carrying body are adapted to be aligned with the shafts or axles of the rollers whereby the shafts or axles may be advanced into engagement with the pivot members to pivotally connect the load carrying body to the vehicle chassis or retracted from the pivot members whereby the load carrying body is supported on the rollers.

In an alternative configuration where the shafts or axles which carry the rollers are fixed to the vehicle chassis, stop means may be provided on the load carrying body adapted for cooperation with the rollers to prevent movement of the body in at least a rearward direction relative to the chassis such that the shafts or axles of the rollers define the axis of pivotal movement of the body for tilting of the body. The stop means may be mounted on the body so as to be movable into or out of engagement with the rollers. Preferably the stop means comprise one or more pivotally mounted stop members and actuating means may be provided to pivot the stop members into a position where they may act as a stop against the rollers. Where the rollers are located within the channels of channel-shaped chassis members of the load carrying body, the stop members are suitably mounted to the chassis members for movement into or out of the channels of the chassis members. The actuating means for the stop members may comprise manually operated actuating means or may comprise a solenoid actuator or fluid actuator such as an hydraulic ram.

Preferably a lifting mechanism is provided to effect the tipping and tilting movement of the load carrying body. The lifting mechanism suitably comprises at least one lifting arm provided between the vehicle chassis and load carrying body. The lifting arm may be pivotally mounted at one end to the vehicle chassis suitably to a pivot support member depending from the chassis. Main actuating means suitably a fluid actuator is provided between the lifting arm and vehicle chassis to effect pivotal movement of the lifting arm. The actuating means is suitably pivotally connected at one end to the lifting arm and at its opposite end to the load carrying body. The opposite end of the lifting arm is suitably pivotally connected to a pivot link which is pivotally connected to the load carrying body. The lifting arm is suitably connected to one end of the pivot link. The opposite end of the pivot link is suitably pivotally connected to the load carrying body. Suitably the pivot connection of the pivot link to the load carrying body is coincident with the pivot connection of the actuating means to the load carrying body.

Preferably releasable connecting means are provided to connect the other end of lifting arm and thus the one end of the pivot link to the load carrying body. The releasable connecting means may comprise a latching mechanism which may be actuated manually or by a mechanical or fluid actuator such as an hydraulic ram.

When the other end of lifting arm and the one end of the pivot link are connected to the load carrying body, actuation of the main actuating means to extend the actuating means will effect movement of the load carrying body rearwardly of the chassis and tilting movement of the load carrying body when the pivot connection between the load carrying body and vehicle chassis is released. When the other end of lifting arm and the one end of the pivot link are disconnected from the load carrying body, actuation of the main actuating means to extend the actuating means will effect tipping movement of the load carrying body about the fixed pivot axis defined by the pivot connection between the load carrying body and vehicle chassis.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 4 is an enlarged side view of the chassis of the load carrying body and the tilting/tipping mechanism;

FIG. 5 is a plan view of the tilting/tipping mechanism of FIG. 4;

FIG. 6 is a sectional view along line A-A of FIG. 5 showing the latch assembly;

FIGS. 8 and 9 illustrate in side and plan views an alternative arrangement for providing a pivot/roller connection between the load carrying body to the vehicle chassis;

DETAILED DESCRIPTION OF THE PREFERRED EMBODIMENTS

Figure 1:
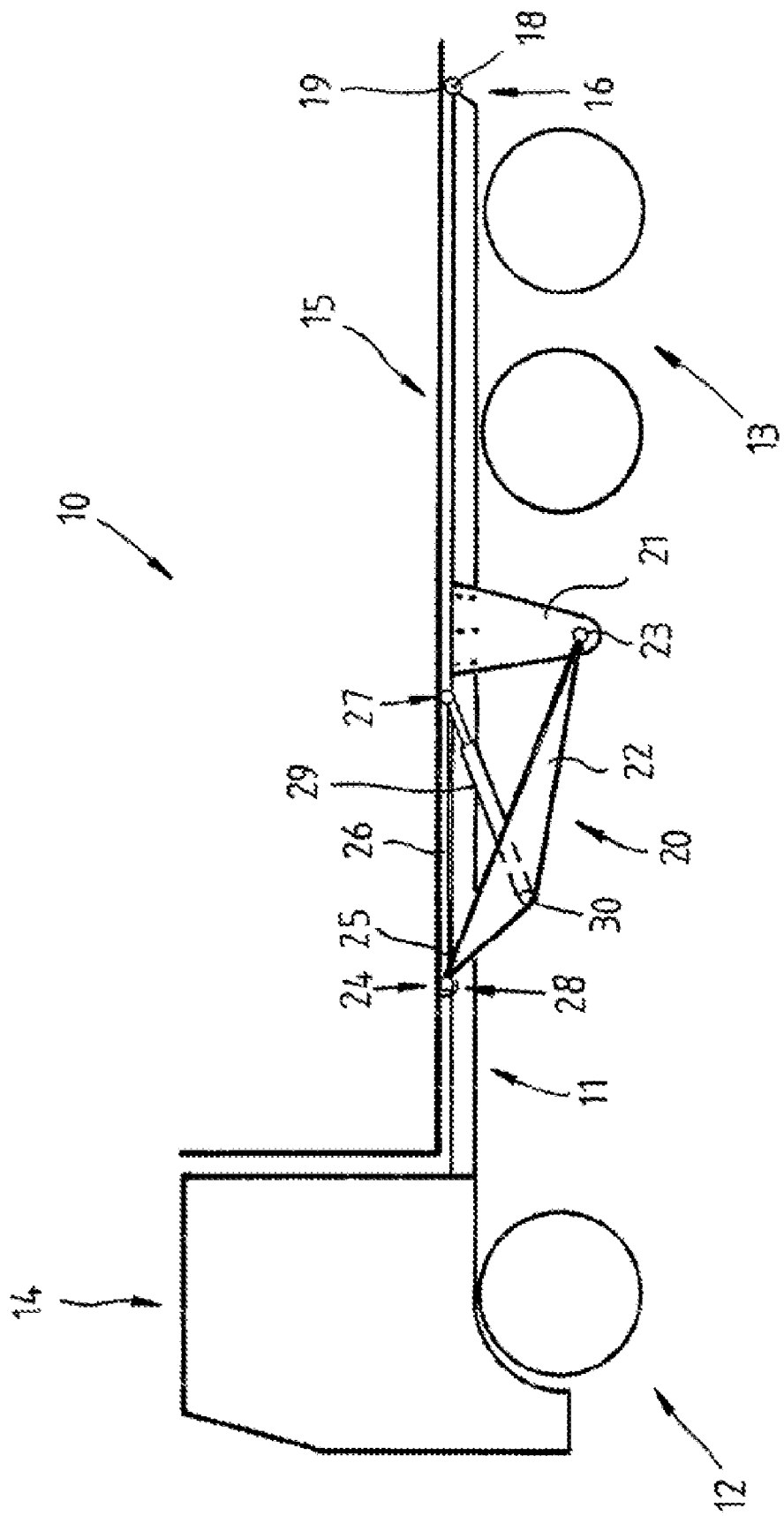
FIG. 1 is a schematic side elevation of a load carrying vehicle according to the present invention.

Referring to the drawings and firstly to FIG. 1, there is illustrated schematically a load carrying vehicle 10 according to an embodiment of the present invention including a chassis 11, front steerable wheels 12 and rear driving wheels 13 supporting the chassis 11 and a driver's cab 14 at the front of the chassis 11. The chassis carries a load carrying body 15 which in the illustrated configuration is in the form of a flat tray but may be of any configuration such as a container-like dump body. The load carrying body 15 in the normal transport position lies substantially flat on the chassis 11.

A releasable pivot assembly 16 is provided to pivotally connect the load carrying body 15 to the rear of the chassis 11 for tipping movement usually about a substantially horizontal axis extending transversely of the chassis 11. The pivot assembly 16" includes on each side of the body 15 a first pivot member 17 fixed to the underside of the body 15 (see FIG. 3) and a pivot pm 18 which is inserted through the pivot member 17 to connect the pivot member 17 to the chassis 11 to define the transverse pivot axis for the body 15. Mounted on each side of the chassis 11 arc rollers 19 which are aligned with the pivot pins 18. When the pivot members 17 are disconnected from the chassis 11 by release of the pivot pins 18, the rollers 19 on opposite sides of the chassis 11 provide roller support to the body 15 for tilting movement and forward and rearward movement relative to the chassis. The pivot pins 18 as described further below also serves as axles which rotatably supports the rollers 19.

For tipping movement of the body 15, the pivot members 17 on the body 15 are connected to the chassis 11 by means of the pivot pins IS to define the transverse axis of pivotal movement of the body 15. To enable longitudinal and tilting movement of the body 15, the pivot pins 18 are released to disconnect the pivot members 17 from the vehicle chassis 11 so that the load carrying body 15 is supported on the rollers 19 and capable of longitudinal movement on the rollers 19 and tilting movement about the rollers 19.

An actuating mechanism 20 is provided to enable the body 15 to be tipped by pivoting about the transverse pivot axis defined by the pivot pins 17 and additionally to enable the body 1.5 to be slid longitudinally of the chassis 11 and simultaneously tilted about a horizontal axis defined by the rollers 19 so that the rear end of the body 15 may be lowered to the ground, the horizontal axis of tilting movement being coaxial with the axis of tipping movement of the body 15. The actuating mechanism 20 includes main pivot support members 21 typically metal plates fixed to each side of the chassis 11 and extending downwardly therefrom. A lifting arm 22 is pivotally connected at one end via a pivot connection 23 to a lower part of the pivot support member 21 and at its opposite end 24 to one end 25 of a pivot link 26. The pivot link 26 is pivotally connected at its opposite end 27 to the body 15 at a position along the body 15 proximate the pivot support member 21, the pivot link 26 in the lowered position of the body 15 extending substantially parallel to the body 15 and chassis 11 with the end 27 of the pivot link 26 being positioned rearwardly of its opposite end 25 which is connected to the end 24 of the lifting arm 22. In the lowered position of the body 15, the pivot link 26 extends at an acute angle to the lifting arm 22.

A releasable latch or connector assembly 28 is provided to selectively latch or connect the end 24 of the lifting arm 22 and thus the connected end 25 of the pivot link 26 to the underside of the body 15. An hydraulic actuator or ram 29 is pivotally connected, at one end 30 to the lifting arm 22 and at it other end to the body 15 at or adjacent the end 27 of the pivot link 26. The pivot connection 30 is located intermediate the opposite ends 24 and 25 of the link arm 23 and is offset from a line between the ends 24 and 25 of the lifting arm 22 to provide the required angle of tipping and tiling movement of the body 15. All the pivot connections between the respective components define pivot axes which are substantially parallel to each other and extend transversely of the vehicle chassis 11.

Figure 2:
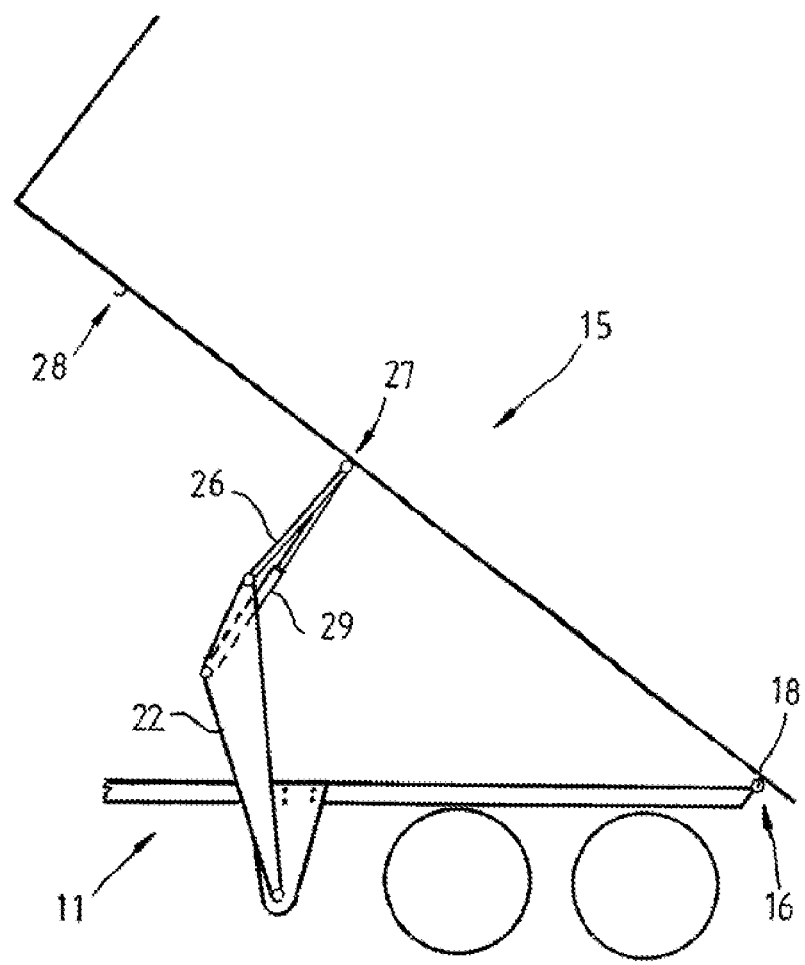
FIG. 2 illustrates the vehicle of FIG. 1 with the load carrying body arranged to operate in a tipping mode.
Figure 3:
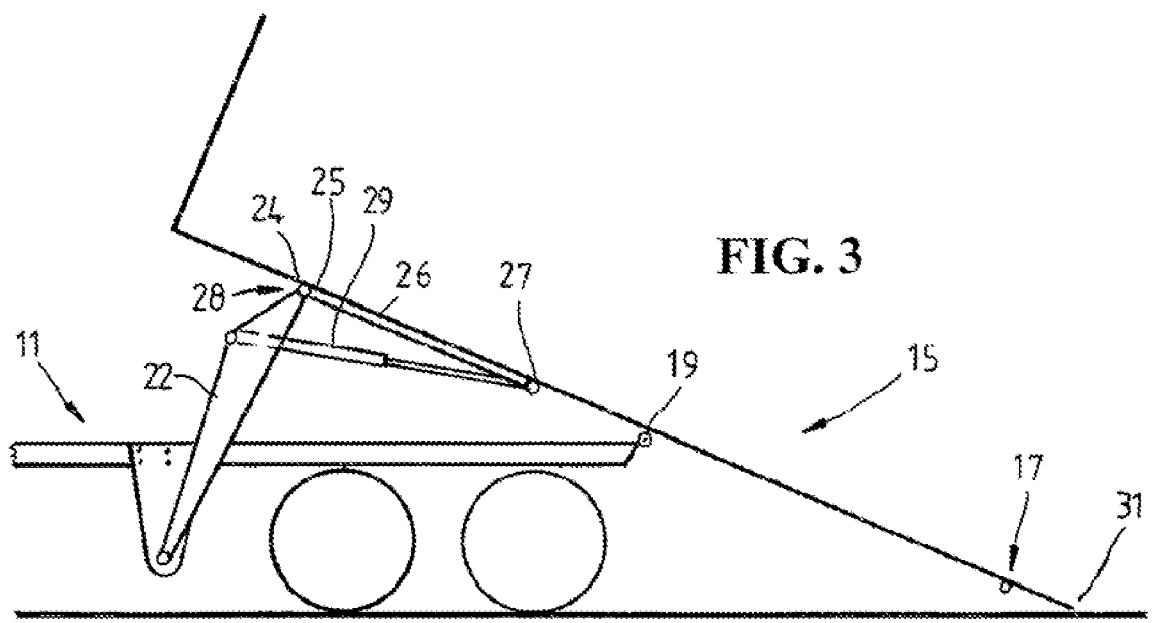
FIG. 3 illustrates the vehicle of FIG. 1 with the load carrying body arranged to operate in a tilting mode.

For tipping of the body 15 about the transverse pivot axis, the latch assembly 28 is released to disconnect the end 24 of the lifting arm 22 and thus the connected end 25 of the pivot link 26 from the body 15. Further the pivot pins 18 are positioned to connect the pivot members 17 on the body 15 to the chassis 11 to define the transverse pivot axis for the body 15. The hydraulic ram or actuator 29 is then extended as shown in FIG. 2 which will cause the body 15 to pivot upwardly about the pivot pins 18. It will be noted from FIG. 2 that during this movement, the pivot link 26 is pivoted anti-clockwise in the attitude of FIG. 2 about its pivot connection at its end 27 to the body 15 whilst at the same time the lifting arm 22 is pivoted clockwise with the ram 29 in urging the pivot link 26 and arm 22 away from each other causing pivoting movement of the body 15 and inclination of the body 15 about the transverse pivot axis. Retraction of the ram 29 will cause the body 15 to be lowered back towards the position of FIG. 1 where it lies substantially flat on the chassis 11. The tipping mode of the vehicle 10 as described above is primarily used for dumping materials such as soil or rocks which may be carried in the body 15.

Where it is desired to move the body 15 longitudinally of the chassis 11 and simultaneously tilt the body 15 as in FIG. 3 which, facilitates loading of machinery or a vehicle onto, or removal of machinery or vehicle from, the body 15, the pivot members 17 are disconnected from the chassis 11 by release of the pivot pins 18 so that the body 15 is supported on the rollers 19. In addition, the end 24 of the lifting arm 22 and thus the connected end 25 of the pivot link 26 arc latched onto the body 15 by means of the latch 28. The pivot link 26 thus is now in a fixed position relative to the body 15. Actuation of the ram 29 in this case will cause clockwise pivotal movement of the lifting arm 22 by acting between the body 15 and arm 22. As however the body 15 is no longer pivotally connected to the chassis 11, the body 15 will be moved rearwardly longitudinally relative to the chassis 11 being supported and Tolling on the rollers 19. In addition, the body 15 is pivoted upwardly about the rollers 19 so that the body 15 will be inclined to the horizontal with the rear end 31 of the body 15 being lowered towards the ground 32. The ram 29 may be actuated so that the end 31 contacts or is adjacent to the ground 32. In this position, machinery or a vehicle supported on the body 15 may be driven from the inclined body 15 onto the ground 32. In addition, machinery or a vehicle may be driven onto the inclined body 15 from the ground 32 with the inclined body 15 acting in the manner of a ramp. When the machinery or vehicle is driven onto the inclined body 15, the operator may simply walk down the inclined body 15 onto the ground 32 after which the ram 29 may be retracted to move the body 15 in a forward directly rolling on the rollers 19 during this movement and also lower body 15 back to the position of FIG. 1 where in lies substantially flat on the chassis 11.

Referring now to FIGS. 4 to 6 there are illustrated further details of a load carrying vehicle according to an embodiment of the present invention with FIG. 4 showing portion of the chassis 33 of a load carrying tray 34 of the vehicle which incorporates an actuating and lifting mechanism 35 for the tray 34. The chassis 33 includes a pair of spaced elongated channel-sectioned chassis members 36 (only one of which is illustrated) and the lifting mechanism 35 includes as in the embodiment of FIGS. 1 to 3, a lifting arm comprising a pair of spaced apart substantially identical lifting arm members 37 pivotally connected at one end via a pivot pin connection 38 to a pivot support member 39 (equivalent to the member 21 of FIG. 1) fixed to and depending from the vehicle chassis 40. The lifting arm 37 are pivotally connected at their opposite end by a pivot pin connection 41 to a pair of spaced substantially identical pivot link members 42 (equivalent to the pivot link 26 of FIGS. 1 to 3) which lie parallel to the chassis member 36 and are pivotally connected at their opposite ends via a pivot pin connection 43 to the chassis member 36 at a position rearwardly of the pivot connection 41. An hydraulic ram or actuator 44 is pivotally connected at one end to the pivot connection 43 and at is opposite end through a pivot pin connection 45 to the lifting arms 37.

To latch the pivot pin connection 41 to the vehicle chassis 40 to allow the tilting/rearward sliding movement of the tray 34 as described above or to release the pivot pin connection 41 to allow simple pivotal dumping or tipping movement of the tray 34, a latch hook 46 (see FIG. 6) is mounted on a shaft 47 which is supported for rotation on the vehicle chassis 40 about an axis which extends transversely of the chassis 40. A lever arm 48 is provided at one or both ends of the shaft 47 and fixed thereto to enable the latch hook 46 to be pivoted between a first position in which it located under the pivot pin or the pivot pin connection 41 to hold the pivot connection 41 (and thus the pivotally connected lifting arms 37 and pivot link arms 42) to the chassis 40 and a second position shown in dotted outline in which the latch hook 46 releases the pivot connection 41 from the chassis 40.

Actuating mechanisms 35 are provided on opposite sides of the vehicle and connected between respective chassis members 36 of the tray 34 and chassis 40 of the vehicle with the hydraulic rams 44 connected in parallel to operate simultaneously. A pair of latch hooks 46 arc spaced apart along, the shaft 47 to enable them to latch the respective pivot pin connections 41 on opposite sides of the chassis 40 to the chassis 40.

To define the pivot axis for tilting of the tray 34, rollers 49 (see also FIG. 7) are provided within the channels of the chassis members 36 with the upper flanges 50 of the members 36 seating on the rollers 49. Each roller 49 is mounted via bushes or bearings 51 on an axle or shaft 52 which extends through aligned bores 53 (which are of substantially the same diameter as the shaft 52) in spaced lugs 54 fixed to a longitudinally extending chassis member 55 of the vehicle chassis 40. The shaft 52 additionally extends through an aperture in the chassis member 36 into a pivot member 56 fixed to the side of the chassis member 36. A bush or bearing 57 in the pivot member 56 receives the shaft 52 and allows pivotal movement of the pivot member 57 and attached chassis member 56 relative to the shaft 52 about pivot axis 58 defined by the shaft 52. The pivot connection arrangement of FIG. 7 is provided between the chassis members 36 of the tray 34 and vehicle chassis members 55 on opposite sides of the vehicle tray 34.

Figure 7:
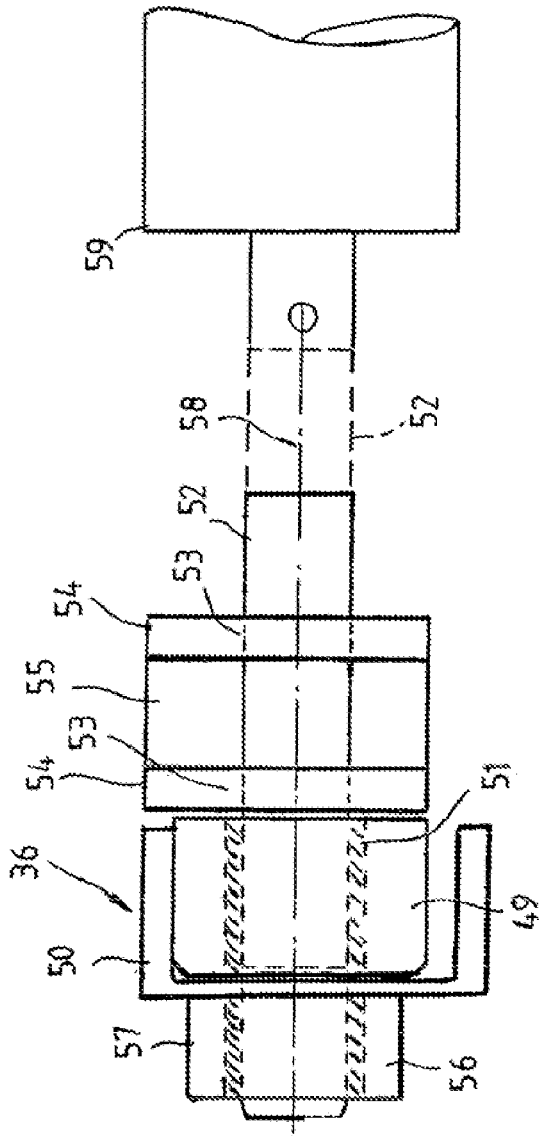
FIG. 7 is an enlarged sectional view along line B-B of FIG. 4 of the pivot/roller connection between the load carrying body and vehicle chassis.

In use and in the position of FIG. 7 and on each side of the tray 34, the chassis member 36 of the load capying tray 34 is pivotally connected to the chassis member 55 of the vehicle through the shafts or axles 52. This allows for pivotal lipping movement of the tray 34 about the axis 58 when the lifting ram 44 is actuated in the manner shown in FIG. 2. When however it is desired that the tray 34 operate in a tilting mode as in FIG. 3, it is necessary to disconnect the pivot connection between the tray chassis members 36 and vehicle chassis members 55. This is achieved by retracting the shafts or axle 52 in an axial direction as illustrated in dotted outline in FIG. 7. This withdraws the shaft or axle 52 from the pivot member 56 so that the chassis member 36 is no longer pivotally connected to the vehicle chassis member 55 through the shaft or axle 52 but is supported on the roller 49 through the shaft or axle 52 to the chassis member 55, This then permits forward and rearward movement of the chassis member 36 (and tray 34) as the chassis member 36 is supported on and rolls on the rollers 49. The chassis members 36 (and tray 34) can also tilt about the rollers 49 as in FIG. 3. The shafts or axles 52 may be moved axially by manual or other actuating means such as by means of an hydraulic actuator or ram 59 as shown in FIG. 7. The actuating means may be connected to the shafts 52 on opposite sides of the vehicle for example through a linkage assembly so as to enable simultaneous movement of the shafts 52 in opposite directions by operation of the actuating means.

Referring now to FIGS. 8 and 9, there is illustrated an alternative mechanism 60 which allows for selected tipping movement of die load carrying body or tray or tilting and longitudinal movement of the tray. In this case, the chassis of the tray or body includes channel-sectioned longitudinally extending chassis members 61 and laterally extending axles 62 are fixed to the vehicle chassis members 63 on opposite sides, of the vehicle and carry respective rollers 64 (similar to the rollers 49) which are mounted for rotation via bushes or bearings on the axles 62. As in the embodiment of FIG. 7, the rollers 64 are located within the channels of the channel shaped chassis members 61 of the tray which are thus supported through their upper flanges 65 on the rollers 64. This arrangement allows for the tilting and longitudinal movement of the vehicle tray in manner described in FIG. 3 with the rollers 64 during this movement rolling relative along and within the channel members 61. In this case however, the rollers 64 can also act as the means for pivotally connecting the tray chassis members 61 to the vehicle chassis members 63 to allow tipping movement of the tray as in FIG. 2 about a substantially fixed pivot axis. For this purpose, a locking plate assembly 66 having spaced locking plates 67 is pivotally mounted via pivot connection 68 to the side of the chassis member 61 for pivotal movement about a substantially upright axis. The adjacent side face of the chassis member 61 is provided with a slot 69 through which the looking plates 67 may move. The locking plates 67 additionally include stop flanges 70 which may abut the side face of the chassis member 61. ? linear actuator 71 which may be a solenoid actuator or an hydraulic or pneumatic actuator is pivotally connected at one end 72 to the locking plates 67 and at its opposite end at 73 to the chassis member 61, Thus actuation of the actuator 72 in opposite directions will effect pivotal movement of the locking plates 67 into and out of the slot 69.

Where the vehicle is to be operated so that the tray or body can be tipped as in FIG. 2, the actuator 71 is retracted to pivot the locking plates 67 about the pivot connection 68 so that they move into the slot 69 and thus into the channel of the chassis member 61 in which they adopt the position shown in dotted outline with the stop flanges 70 abutting the side face of the chassis member 61. It will be seen in this position that the stop locking plates 67 are moved to a position adjacent to or in contact with the roller 64 to act as a stop to movement of the roller 64 along the chassis member 61. Thus when the lifting ram 44 is operated to pivot the tray chassis, the chassis members 61 will be unable to move rearwardly due to the locking plates 67 abutting the roller 64 and will thus be constrained to pivot about the rollers 64 on opposite sides of the vehicle which will thus define the pivot axis for the tray. Subsequent extension of the actuator 71 will move the locking plates 67 out of the channel shaped members 61 so that the members 61 are no free to move on the rollers 64.

Similar locking mechanisms 60 are provided on apposite sides of the chassis to cooperate with respective rollers 64 and the actuators 71 are preferably arranged to operate simultaneously.

Figure 10:
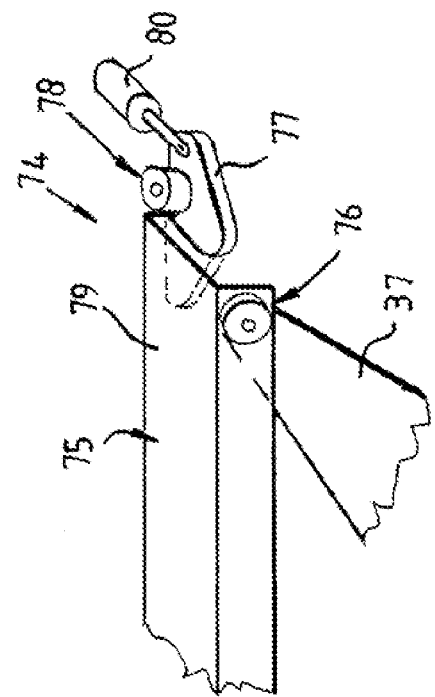
FIG. 10 illustrates an alternative latch assembly for the lifting arm and pivot link.
Figure 11:
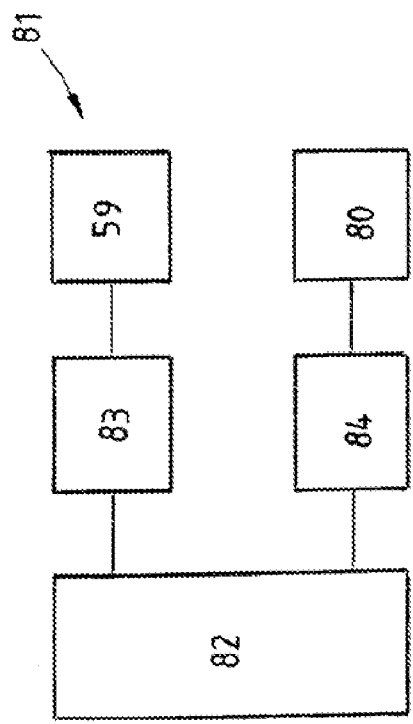
FIG. 11 illustrates a typical control system for the vehicle.

Referring now to FIG. 10, there is illustrated an alternative mechanism 74 for selectively latching or connecting the lifting aims and pivot links to the chassis of the vehicle as an alternative to the arrangement of FIG. 6. In this case the pairs of pivot link members 42 of FIG. 5 are replaced by a single channel sectioned pivot link 75 connected by pivot pin connection 76 to the lifting arms 37. The latching mechanism 74 includes a latch member 77 which is pivotally mounted, by pivot connection 78 to the vehicle chassis for movement about an axis extending normal to the chassis. The latch member 77 may be rotated about the pivot connection to a position as shown in dotted outline in which it extends into the channel sectioned link 75 and holds the upper flange 19 of the pivot link 75 to the chassis of the vehicle. Pivotal movement of the latch member 77 in the opposite direction will release the flange 19 of the pivot link 75 from the vehicle chassis so that the body can be pivoted for tipping movement as in FIG. 2. The latch member 77 may be rotated by a connected lever arm or by means of a mechanical or fluid actuator such as an hydraulic ram 80 as illustrated. Of course connecting mechanisms of FIG. 10 are provided on both sides of the vehicle chassis for cooperation with respective links 75 and the actuators 80 are preferably connected for simultaneous and corresponding operation.

Where the pivot connection between the body or tray and the vehicle chassis is established through hydraulic or other actuators and the connection between the end of the lifting arm and attached pivot link and the vehicle chassis (as described in FIGS. 6 and 10) is also effected by hydraulic or other actuators, control means may be associated with the actuators such that when the lifting arm is connected to the chassis, the pivot connection between the body or tray is disconnected so that the load carrying body 15 will tilt as shown in FIG. 3. Similarly the control means will operate such that when the lifting anil is disconnected from the chassis, the pivot connection between the body or tray is made so that the load carrying body 15 will tip as shown in FIG. 2. The control means may where the actuators are hydraulic actuators include solenoid valves which will control the supply of fluid to the respective actuators. The control means may be located within the cab 14 of the vehicle or alternatively on the vehicle chassis for operation by an operator.

A typical control system 81 is shown in FIG. 1 wherein a controller 82 controls a first solenoid valve 83 to control the supply of fluid to for example to the actuator 59 for the axle or shaft 52 of FIG. 7 and a second solenoid valve 84 controls the supply of fluid for example the actuator 80 of the latch mechanism 74 of FIG. 1. The controller controls the solenoid valves 83 and 84 such that when the valve 83 supplies fluid to the actuator 59 to advance the axle or shaft 52 into the pivot member 56 to define the pivot connection between, the load carrying body 15 and chassis 11, the solenoid valve 84 will be actuated to supply fluid to the actuator 80 to retract the latch member 77 so that the link arms 37 are disconnected from the body 15. Similarly when the valve 83 supplies fluid to the actuator 59 to retract the axle or shaft 52 from the pivot member 56 so that the body 15 is supported by the rollers 49, the solenoid valve 84 will be actuated to supply fluid to the actuator 80 to advance the latch member 77 to the dotted outline position of FIG. 10 so that the link arms 37 are connected to the body 15. Similar controlling arrangements may be used with different forms of pivot connection and latching mechanisms.

Whilst particular actuating mechanism and pivot arrangements for the vehicle have been described above, it will be appreciated that many different variations of connections between the respective components and actuating mechanisms may be used without varying from the inventive concept.

The lifting arms and pivot links of the apparatus are typically constructed of steel plate but alternative materials may be used for their construction.

The embodiment describes lifting mechanisms on each side of the chassis of the vehicle however as an alternative a single lifting mechanism may be provided centrally of the vehicle chassis and perform the same function as the dual lifting mechanisms. Further whilst rollers on the chassis are provided to support the load carrying body on the chassis, the rollers may be replaced by slides which will perform the same function in allowing the body to slide longitudinally of the chassis and tiling movement about the slides.

The invention may also be applied to other vehicle of a configuration other than that described above and shown in the embodiments.

The terms "comprising" or "comprises" as used throughout the specification and claims are taken to specify the presence of the stated features, integers and components referred to but not preclude the presence or addition of one or more other feature/s, integer/s, component/s or group thereof.

Whilst the above has been given by way of illustrative embodiment of the invention, all such variations and modifications thereto as would be apparent to persons skilled in the art are deemed to fall within the broad scope and ambit of the invention as defined in the appended claims.

The invention claimed is:

1. A load carrying vehicle comprising:
a mobile chassis,
a load carrying body,
a releasable pivot assembly for pivotally connecting said body to the rear of said chassis, said pivot assembly permitting in a first mode of operation of said vehicle, pivotal tipping movement of said load carrying body about a fixed pivot axis extending transversely of and at the rear of said chassis, said pivot assembly being releasable to permit in a second mode of operation of said vehicle, tilting movement of said load carrying body in which said body is moved longitudinally and rearwardly of said chassis and pivoted about a tilt axis extending transversely of said chassis to an inclined attitude, said body being supported by the rear of said chassis in said inclined attitude, and
an actuating mechanism connected between said chassis and said load carrying body, said actuating mechanism comprising:
at least one lifting arm pivotally connected to said vehicle chassis at a position forwardly of said releasable pivot assembly for movement about a transverse pivot axis, a pivot link pivotally connected at one end to said lifting arm and at its opposite end to said load carrying body at a fixed position along said body, releasable connecting means for connecting said at least one lifting arm to said load carrying body, and an extendable and retractable actuating means connected to said at least one lifting arm to cause when actuated pivotal movement of said at least one lifting arm, and
wherein in said first mode of operation of said vehicle, said releasable connecting means connects said at least one lifting arm to said load carrying body whereby extension of said actuating means causes said tipping movement of said load carrying body and wherein in said second mode of operation of said vehicle, said releasable connecting means releases said at least one lifting arm from said load carrying body whereby extension of said actuating means causes said at least one lifting arm and said pivot link to pivot relative to each other and said tilting movement of said load carrying body.

2. A load carrying vehicle as claimed in claim 1 wherein said at least one lifting arm has a first end and a second end, said first end being pivotally connected to said chassis and said second end is pivotally connected to said pivot link.

3. A load carrying vehicle as claimed in claim 2 wherein said first end of said at least one lifting arm is pivotally connected to a pivot support member depending downwardly from said chassis.

4. A load carrying vehicle as claimed in claim 1 wherein said actuating means is pivotally connected at one end to said at least one lifting arm intermediate the ends thereof and at its other end to said load carrying body.

5. A load carrying vehicle as claimed in claim 4 wherein the pivot connection of the said opposite end of said pivot link to the load carrying body is coincident with the pivot connection of the actuating means to the load carrying body.

6. A load carrying vehicle as claimed in claim 4 wherein the connection of said one end of said actuating means to said lifting arm is offset from a line between the pivotal connections of said lifting arm to said chassis and said pivot link.

7. A load carrying vehicle as claimed in claim 1 wherein said actuating means comprises an hydraulic actuator or ram.

8. A load carrying vehicle as claimed in claim 1 wherein said releasable connecting means for said second end of said at least one lifting arm comprises a latching mechanism on said load carrying body for releasably latching said second end of said at least one lifting arm to said load carrying body.

9. A load carrying vehicle as claimed in claim 1 and including roller means for providing rolling support to said body on said chassis for said tilting movement of said body when said releasable pivot assembly is released.

10. A load carrying vehicle as claimed in claim 1 wherein said releasable pivot assembly comprises at least one pivot shaft or pin and wherein said load carrying body carries a pivot member and wherein said at least one pivot shaft or pin is supported to said chassis and is adapted to be moved into engagement with said pivot member to define a pivot connection between said load carrying body and said chassis or disengaged therefrom to disconnect said pivot connection.

11. A load carrying vehicle as claimed in claim 10 wherein said at least one pivot shaft or pin comprise a pair of pivot shafts or pins mounted on respective opposite sides of said chassis, said pivot pins or shafts being engageable with, or disenagaeable from respective pivot members carried by said load carrying body.

12. A load carrying vehicle as claimed in claim 10 wherein said roller means comprise at least one roller rotatably mounted on the or each said pivot shaft or pin for cooperation with a chassis member or members of the load carrying body.

13. A load carrying vehicle as claimed claim 1 and including one or more rollers mounted rotatably to said chassis, said load carrying body being supported on said rollers whereby said body is capable of said tilting movement, and there being stop means on said load carrying body adapted for cooperation with said roller or rollers to prevent longitudinal movement of the load carrying body in at least a rearward direction relative to the chassis such that the axis of said rollers can define said fixed pivot axis for said tipping movement of said body.

14. A load carrying vehicle as claimed in claim 13 wherein said one or more rollers comprise rollers rotatably mounted on shafts to opposite sides of said chassis, said shafts defining said fixed pivot axis in said first mode of operation of said vehicle.

15. A load carrying vehicle as claimed in claim 1 wherein said load carrying body is movable by said actuating mechanism from a position in which said body lies substantially flat on or adjacent said chassis.

16. A load carrying vehicle comprising:
a mobile chassis,
a load carrying body,
a releasable pivot assembly for pivotally connecting said load carrying body to the rear of said chassis, said pivot assembly in a first mode of operation of said vehicle pivotally connecting said load carrying body to said chassis for pivotal tipping movement of said load carrying body about a fixed pivot axis extending transversely of and at the rear of said chassis, said pivot assembly being releasable to permit in a second mode of operation of said vehicle, tilting movement of said load carrying body in which said body is movable longitudinally and rearwardly of said chassis and pivotable about a tilt axis extending transversely of said chassis to an inclined attitude, said load carrying body in said inclined attitude being supported by the rear of said vehicle, and
an actuating mechanism connected between said chassis and said load carrying body, said actuating mechanism comprising:
at least one lifting arm pivotally connected to said vehicle chassis at a position forwardly of said releasable pivot assembly for movement about a transverse pivot axis,
a pivot link pivotally connected to said lifting arm and to said load carrying body at a position between the opposite ends of said body, and
actuating means for pivotally moving said lifting arm about its pivotal connection to said chassis, said actuating means being operable in said first mode of operation of said vehicle to cause said tipping movement of said load carrying body and said actuating means being operable in said second mode of operation of said vehicle to cause said tilting movement of said load carrying body.

17. A load carrying vehicle as claimed in claim 16 wherein said lifting arm has a first end and a second end, said first end being pivotally connected to said vehicle chassis and said second end being pivotally connected to said pivot link, releasable connecting means for releasably connecting or holding said second end of said lifting arm to said load carrying body for operation of said vehicle in said second mode, said releasable connecting means being adapted to disconnect or release said second end of said lifting arm from said load carrying body for operation of said vehicle in said first mode.

18. A load carrying vehicle comprising:
a mobile chassis,
a load carrying body,
a releasable pivot assembly for pivotally connecting said body to the rear of said chassis,
at least one lifting arm, said lifting arm having a first end and a second end, said first end being connected to said vehicle chassis at a position forwardly of said releasable pivot assembly for pivotal movement relative to said chassis, and said second end of said lifting arm being pivotally connected to a pivot link,
said pivot link being pivotally connected to said body at a position along said load carrying body,
actuating means for pivotally moving said lifting arm, and
means for releasably holding or connecting said second end of said lifting arm to said body and wherein in a first mode of operation of said vehicle, said releasable holding or connecting means releases said second end of said lifting arm from said body to permit said at least one lifting arm and pivot link to pivotally move relative to each other upon actuating of said actuating means to cause tipping movement of said load carrying body about a fixed transverse pivot axis defined by said pivot assembly and wherein in a second mode of operation of said vehicle, said releasable pivot assembly disconnects the pivotal connection of said load carrying body to said chassis and said releasable connecting or holding means connects or holds said at least one lifting arm to said body whereby actuation of said actuating means to cause pivotal movement of said at least one lifting arm causes movement of said body longitudinally and rearwardly of said chassis and pivotal movement of said body about a tilt axis extending transversely of said chassis.

19. A load carrying vehicle as claimed in claim 18 and including a pivot support member fixed to and depending downwardly from said chassis, said first end of said at least one lifting arm being pivotally connected to said pivot support member and wherein said actuating means comprises an hydraulic ram pivotally connected to said at least one lifting arm.

20. A load carrying vehicle as claimed in claim 18 wherein said releasable pivot assembly comprises at least one roller providing rolling support for said body on said chassis to allow for said longitudinal and tilting movement of said body when said pivot assembly is released and wherein said releasable pivot assembly includes means for preventing said body rolling on said at least one roller to allow for said tipping movement of said body about said fixed pivot axis.

* * * * *